(12) United States Patent
Bernstein et al.

(10) Patent No.: US 7,210,724 B2
(45) Date of Patent: May 1, 2007

(54) RAISED FLOOR TRACTOR-TRAILER SLEEPER

(75) Inventors: William M. Bernstein, Pittsburgh, PA (US); Derek Blitz, Portland, OR (US); Andrew Kilb, Carrboro, NC (US); Megan M. Stanton, Long Beach, CA (US); David M. Wynne, Fishkill, NY (US); Deepshikha B. Antes, Columbia, MD (US); Edwin K. Chan, Wilmington, DE (US); Benjamin G. Morris, Falls Church, VA (US); Scott Raven, Atlanta, GA (US)

(73) Assignee: International Truck Intellectual Property Company, LLC, Warrenville, IL (US)

( * ) Notice: Subject to any disclaimer, the term of this patent is extended or adjusted under 35 U.S.C. 154(b) by 0 days.

(21) Appl. No.: 11/339,029

(22) Filed: Jan. 25, 2006

(65) Prior Publication Data

US 2006/0170250 A1    Aug. 3, 2006

Related U.S. Application Data

(60) Provisional application No. 60/646,817, filed on Jan. 25, 2005.

(51) Int. Cl.
*B60N 3/12* (2006.01)
(52) U.S. Cl. .............................. 296/37.14; 296/190.02; 296/37.15
(58) Field of Classification Search ........... 296/190.01, 296/190.02, 37.14
See application file for complete search history.

(56) References Cited

U.S. PATENT DOCUMENTS

| | | | | |
|---|---|---|---|---|
| 4,121,684 A | * | 10/1978 | Stephens et al. ....... | 296/190.02 |
| 4,733,898 A | * | 3/1988 | Williams ................... | 296/37.6 |
| 4,969,678 A | * | 11/1990 | Loisel ...................... | 296/37.16 |
| 5,011,208 A | * | 4/1991 | Lewallen ................. | 296/37.16 |
| 5,201,379 A | * | 4/1993 | Penzotti et al. ........ | 296/190.02 |
| 5,441,183 A | * | 8/1995 | Frenzel ..................... | 296/37.1 |
| 6,106,044 A | * | 8/2000 | Schlachter ............... | 296/37.15 |
| 6,247,741 B1 | * | 6/2001 | Seel et al. ............... | 296/37.14 |
| 6,386,612 B2 | * | 5/2002 | Hofmann et al. ........ | 296/37.15 |
| 6,488,327 B1 | * | 12/2002 | Pearse et al. ............ | 296/37.15 |
| 6,540,279 B1 | * | 4/2003 | Bargiel ..................... | 296/37.15 |
| 6,578,905 B1 | * | 6/2003 | Buchanan et al. ..... | 296/190.02 |
| 6,644,523 B1 | * | 11/2003 | Salas ........................ | 296/37.15 |
| 6,644,709 B2 | * | 11/2003 | Inagaki et al. ........... | 296/37.14 |
| 6,644,724 B1 | * | 11/2003 | Penaloza et al. ........ | 296/190.02 |
| 6,718,574 B1 | * | 4/2004 | Bradley et al. ......... | 296/190.02 |
| 6,899,379 B1 | * | 5/2005 | Milenovich ............ | 296/190.02 |
| 6,945,594 B1 | * | 9/2005 | Bejin et al. .............. | 296/37.14 |
| 7,073,216 B2 | * | 7/2006 | Schwingeler et al. .. | 296/190.02 |
| 2004/0178663 A1 | * | 9/2004 | Whelan ................. | 296/190.02 |

* cited by examiner

*Primary Examiner*—Kiran B. Patel
(74) *Attorney, Agent, or Firm*—Jeffrey P. Calfa; Gerald W. Askew; Susan L. Lukasik

(57) ABSTRACT

A raised floor sleeper for an over the road tractor for pulling a trailer. In order to effectively utilize the upper space in a sky-rise sleeper cab, one must first be able to reach it, which is the fundamental reason for the raised floor. Beyond bringing the upper space to the driver, raising the floor offers many other advantages. A combination stool and coffee table provides options that are enabled by the raised floor. The stool offers additional seating for socializing. The stool also functions as a freestanding table leg for the coffee table. The coffee table has a female indent on the bottom that mate with the stool. Two legs fold out supporting the other side of the table.

5 Claims, 4 Drawing Sheets

RAISED FLOOR TRACTOR-TRAILER SLEEPER

This patent issues from a non-provisional patent application claiming the priority of provisional patent applications Ser. No. 60/646,817, filed Jan. 25, 2005.

BACKGROUND

Trucks carry a bulk of the goods within the United States. Driver's have a difficult lifestyle in which they spend much of their time within the cab and sleeper of their over the road tractor trailers. They must comply with federal regulations in the United States that limit the amount of time behind the wheel as well as boredom and discomfort living life within the walls of what has been likened to a small mobile studio apartment. For employers that employ over the road drivers, retention has become a challenge. The general method of moving goods with trucks is not likely to change in the foreseeable future. The results of a survey performed by the inventors of this patent show that during their off-hours, truckers spend an average of 3.6 hours in truck awake. Of these hours, they spend about one hour preparing food, nearly an hour socializing with friends inside their trucks, and about 2.5 hours entertaining themselves with television or books. This invention and the project that it sprang from is intended to:

Create a space that drivers will be proud to show to other drivers,

Allow for 3–5 truckers to socialize together in the truck comfortably,

Create a space for food preparation and storage specific to the eating habits of truckers, Create a bright and entertaining environment, Give drivers a sense of separation between work and leisure, Give drivers a way to isolate their sleeping space from their living space, and Optimize the limited amount of space in a sleeper for storage.

Research pointed heavily towards providing truck drivers with a place to lounge comfortably, and utilizing the lower bunk space for the dual purpose of seating and sleeping is the most efficient way to achieve this. It was very important that the transition from seating to sleeping and back be as quick and effortless as possible. Any amount of extra effort on the driver's would most likely lead to underutilization of the feature. This criterion led us to the raised floor sleeper vehicle specifically a highway truck. The invention focuses on providing a raised floor in the sleeper section of a line haul truck. The raised floor allows the driver to access the previously unusable upper space. This allows for innovation within the space, because now that drivers can touch it, putting components there makes a lot of sense. This also makes the floor space more useable with the possibilities for storage, insulation, telescoping and retracting subcomponents.

One of the items that it is used in conjunction with the raised floor is a combination stool and coffee table. The solution of the combination stool and coffee table is two fold, affording a perching height stool for doing work on the flexible workspace desk or providing a social environment for the targeted three to five truckers to sit comfortably in the sleeper. The coffee table partners with the flat screen television installed in the upper space to create a cinematic yet ergonomic environment. When not in use, the combination stool and coffee table is stored in the raised floor storage space. The table also functions as a great secondary work surface or an ottoman for lounging or watching television. Finally, because the coffee table is not fixed to a wall and is free standing in the middle of the space it has the effect of enlarging the space. It can be navigated 360 degrees, which effectively makes the space feel much larger.

SUMMARY

This invention relates to a raised floor sleeper for an over the road tractor for pulling a trailer. In order to effectively utilize the upper space in a sky-rise sleeper cab, one must first be able to reach it, which is the fundamental reason for the raised floor. Beyond bringing the upper space to the driver, raising the floor offers many other advantages.

Under Floor Storage—The prototype offers three under floor storage bins. These plastic bins lift out providing the option for cleaning. Also, bins can be replaced, and the driver can easily swap out bins with different contents depending on the nature of the particular haul.

Exterior Storage—Because the entire floor is raised, and not just the space under the lower bunk, the amount of space available for exterior accessible storage is significantly increased. Some of this storage can also be accessible from both outside and inside the tractor.

Thermal and sound Insulation—The raised floor offers a significant insulation advantage over the current un-insulated floor. The large volume of air alone will provide thermal insulation and decrease road noise, and the extra space provides an opportunity to add additional insulation.

Isolation—The step up from the cab into the living space provides a feeling of transition. The vertical step provides the driver with a feeling of two separate rooms for work and home.

Increased perception of space—Though it would seem that raising the floor would decrease the user's perception of space, the opposite is true. Because of the height of the driver's and passenger's seats, forward vision is obstructed with a normal height floor. The height of the seats in conjunction with the curtain location creates the perception that the living space ends there. By raising the trucker, the forward line of sight is unobstructed and the entire upper volume effectively becomes a part of the living space, significantly increasing the perception of space as well as actual usable space.

Power Management & HVAC—The raised floor provides an easily accessible location to run power and HVAC lines.

Appliance storage—By providing power and storage under the floor, more usable appliances can be provided. The prototype features a vacuum in an under floor storage bin. Because it is always plugged in and has a dedicated storage location when not in use, the hassles normally related to vacuuming a truck are removed.

Limitless innovation—The new available space provides an opportunity for innovation. The attributes listed above are recommendations, but other possibilities for solutions that utilize this space are plentiful.

The combination stool and coffee table provides options that are enabled by the raised floor. The stool offers additional seating for socializing as well as a slightly higher seating position for more ergonomic clerical work at the pull-out table/office. This stool could be designed to telescope pneumatically up from the floor, but the prototype is stored in one of the under floor storage bins and then drops into a hole in the floor which keeps it upright. The stool also functions as a freestanding table leg for the coffee table. The coffee table has a female indent on the bottom that mate with the stool. Two legs fold out supporting the other side of the table. This table creates a comfortable social space that can comfortably accommodate five people. By swiveling the front seats, the entire space is utilized for a lounge like feel.

DRAWINGS

Other objects and advantages of the invention will become more apparent upon perusal of the detailed description thereof and upon inspection of the drawings, in which.

DESCRIPTION OF INVENTION

Figure 1:
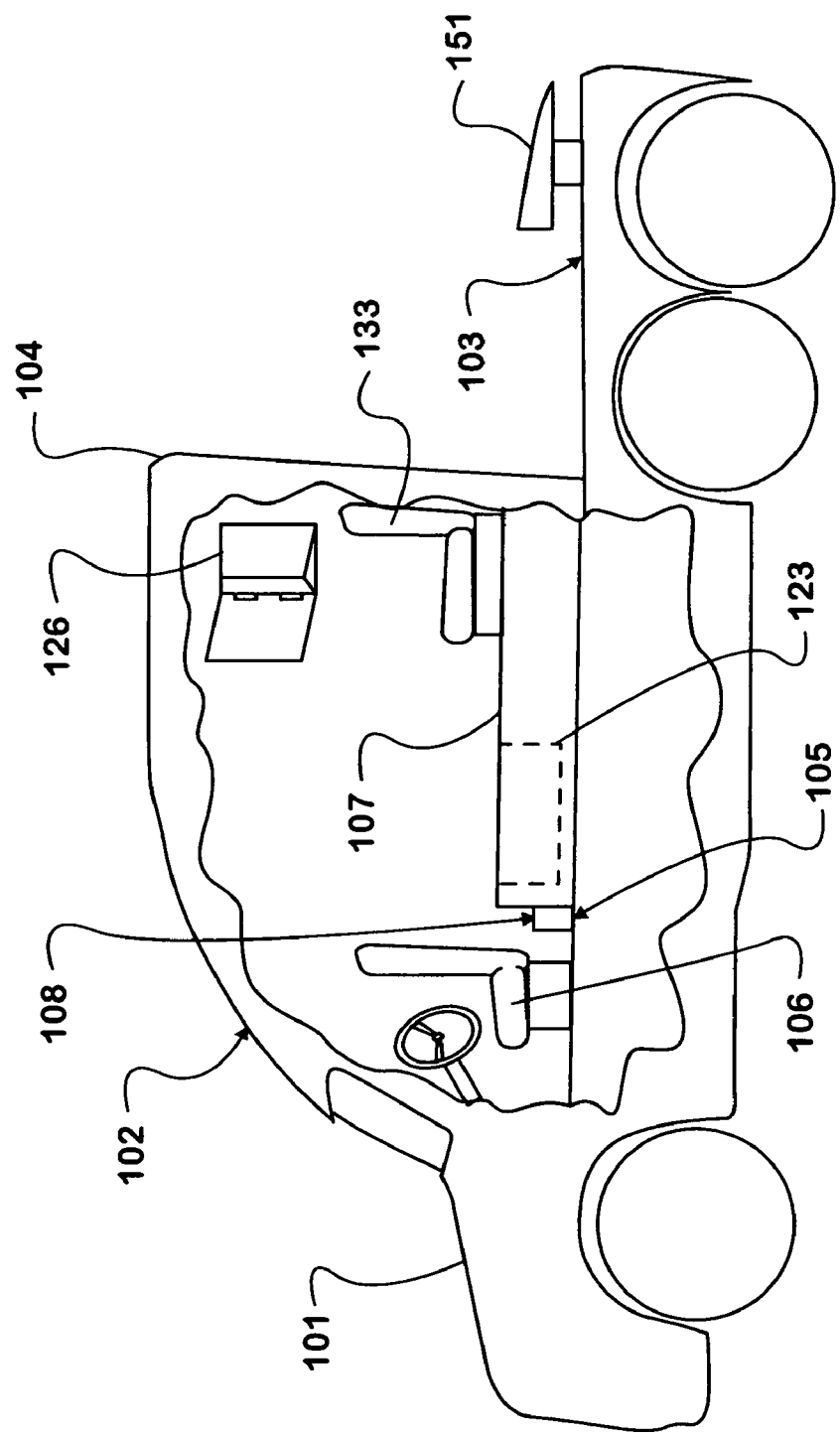
FIG. 1 is a side view of a raised floor tractor trailer sleeper vehicle made in accordance with this invention.
Figure 2:
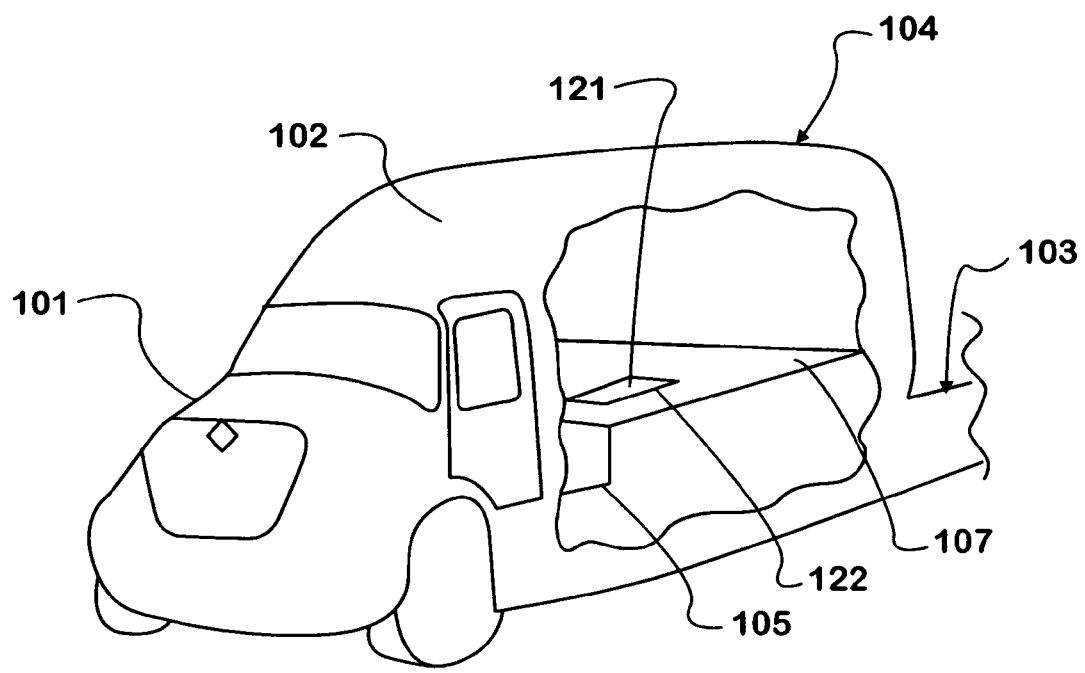
FIG. 2 is a partial cutaway perspective view of the raised floor tractor trailer sleeper vehicle shown in FIG. 1 without furnishings.
Figure 3:
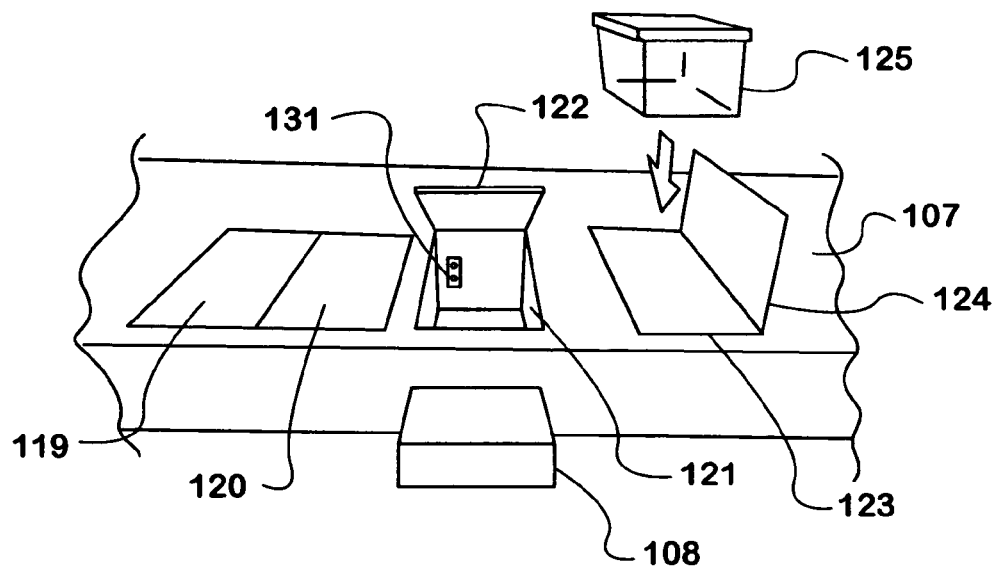
FIG. 3 is a partial head on view of the raised floor area of the vehicle of FIG. 1.

A motor vehicle 101, specifically a tractor trailer, includes a cab 103 engaged to a drive train bearing chassis 102. There is a sleeper compartment 104 that includes driver living space. The sleeper compartment 104 is integrated into the cab 103. There is a fifth wheel 151 for engagement of the vehicle 101 to a trailer. The sleeper compartment 104 includes a mounting floor 105 that is level with the bottom of the driver's seat 106. The sleeper 104 of the vehicle 101 shown in FIGS. 1 to 4 has a raised floor 107 made in accordance with the invention. The raised floor 107 includes the off duty living space for the driver or drivers.

The vehicle 101 has a driver seating area that includes a driver's seat 106 engaged to a standard level mounting floor 105. Proceeding rearward on the vehicle 101, there is a step up to a raised floor 107. This is shown on FIGS. 1 to 4. Furnishings such as a couch 133 may be installed on the raised floor 107 of the sleeper. The advantages of the raised floor 107 will be further listed below. There may be a mid-sized step 108 to improve the accessibility of the raised floor 107 area in the sleeper 104. Storage cabinets 126 may be included in the upper reaches of the sleeper 104, these are areas that were not easily accessed by shorter drivers in the past.

The raised floor 107 allows for increased internally accessible storage areas. In the version shown in FIG. 3, there are three internally accessible storage areas 120, 121, and 123 included within the raised floor 107. Storage area 120 is accessible by double doors 119, and may include a combination stool 161 and table 171 when such furnishing is not in use. Storage area 121 is accessible by door 122. Storage area 121 by way of example includes an AC electrical outlet 131. The design is such that the driver may store a portable electrical device such as a vacuum cleaner in the storage area 121. When the driver desires to vacuum, he or she can plug the device into the outlet 131 and vacuum the sleeper. This provides the driver with an easy way to store and use such an electrical device. The For such an AC electrical device, the vehicle would have to have an inverter to convert normal onboard DC power to AC. Each of the storage areas may have removable bins 125. The bins 125 can be replaced, and the driver can easily swap out bins 125 with different contents depending on the nature of the particular haul.

Figure 5:
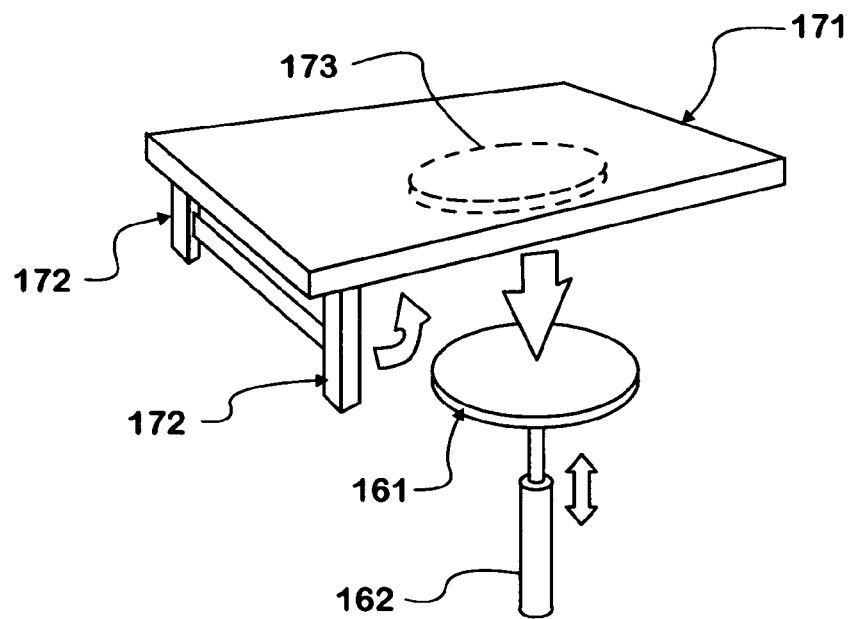
FIG. 5 is a perspective view of the combination stool and coffee table of FIG. 4.
Figure 4:
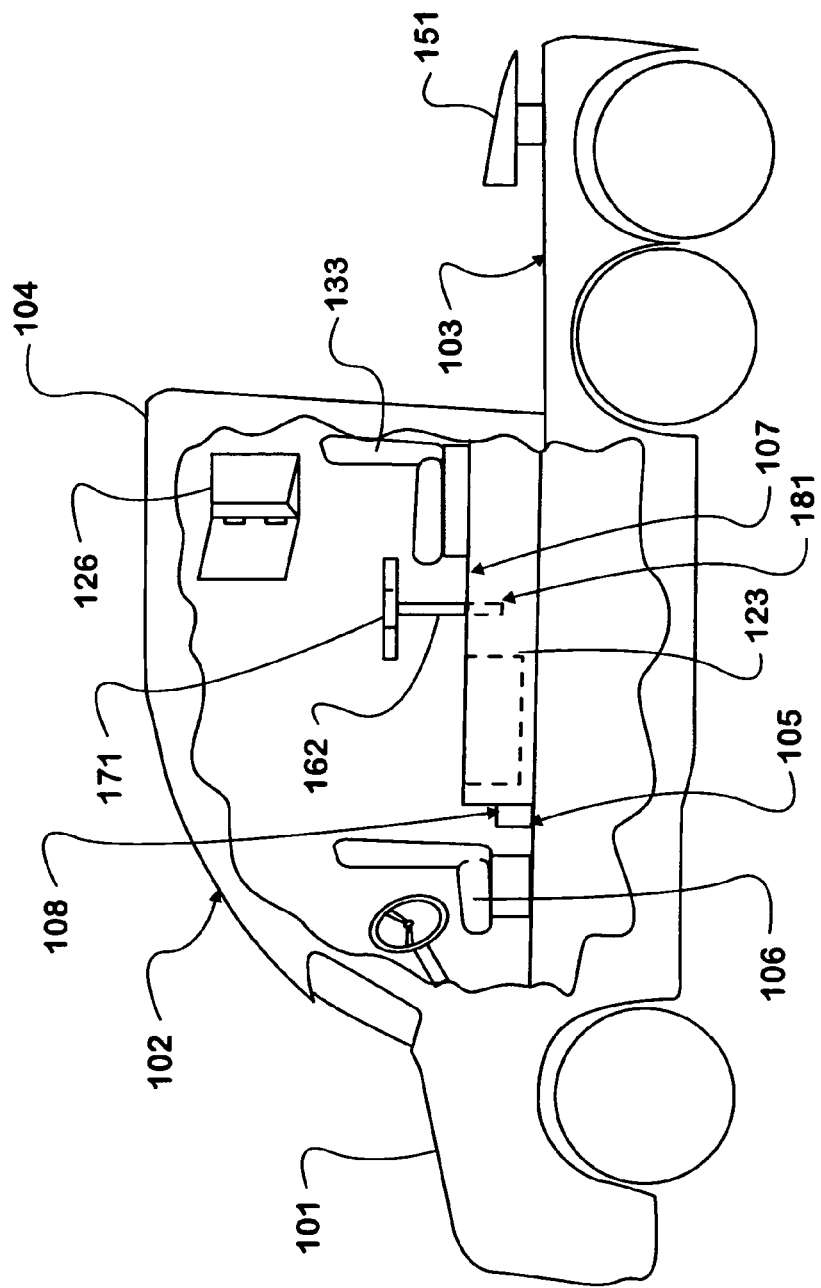
FIG. 4 is a partial cutaway perspective view of the raised floor tractor trailer sleeper vehicle shown in FIG. 1 with a combination stool and coffee table installed.

The bins, such as bin 120 may store furnishings for converting the use of the sleeper compartment 104 from a mere sleeping compartment to an entertaining area for the driver. Such a furnishing is the combination stool 161 and table 171 as shown installed in FIG. 4 and individually in FIG. 5. The combination stool and coffee table provides options that are enabled by the raised floor. The stool 161 consists of circular seat and a stem 162. The stool 161 offers additional seating for socializing. It also offers a slightly higher seating position for more ergonomic clerical work at a pull-out table/office. This stool 161 could be designed to telescope via the stem 161 pneumatically up from the floor 107, but the prototype is stored in one of the under floor storage bins 120 and then drops into a hole 181 in the floor 107 which keeps it upright. The stool 161 also functions as a freestanding table leg for the coffee table 171. The coffee table 171 has a female indent 173 on the bottom that mate with the stool 161. Two legs 172 fold out supporting the other side of the table 171. This table 171 creates a comfortable social space that can comfortably accommodate five people. By swiveling the front seats 109, the entire space is utilized for a lounge like feel.

There are numerous advantages to the raised floor sleeper vehicle 101. For instance:

Under Floor Storage—The prototype offers three under floor storage bins. These plastic bins lift out providing the option for cleaning. Also, bins can be replaced, and the driver can easily swap out bins with different contents depending on the nature of the particular haul.

Exterior Storage—Because the entire floor is raised, and not just the space under the lower bunk, the amount of space available for exterior accessible storage is significantly increased. Some of this storage can also be accessible from both outside and inside the tractor.

Thermal and sound Insulation—The raised floor offers a significant insulation advantage over the current un-insulated floor. The large volume of air alone will provide thermal insulation and decrease road noise, and the extra space provides an opportunity to add additional insulation.

Isolation—The step up from the cab into the living space provides a feeling of transition. The vertical step provides the driver with a feeling of two separate rooms for work and home.

Increased perception of space—Though it would seem that raising the floor would decrease the user's perception of space, the opposite is true. Because of the height of the driver's and passenger's seats, forward vision is obstructed with a normal height floor. The height of the seats in conjunction with the curtain location creates the perception that the living space ends there. By raising the trucker, the forward line of sight is unobstructed and the entire upper volume effectively becomes a part of the living space, significantly increasing the perception of space as well as actual usable space.

Power Management & HVAC—The raised floor provides an easily accessible location to run power and HVAC lines.

Appliance storage—By providing power and storage under the floor, more usable appliances can be provided. The prototype features a vacuum in an under floor storage bin. Because it is always plugged in and has a dedicated storage location when not in use, the hassles normally related to vacuuming a truck are removed.

Limitless innovation—The new available space provides an opportunity for innovation. The attributes listed above are recommendations, but other possibilities for solutions that utilize this space are plentiful.

As described above, the raised floor tractor trailer sleeper vehicle provides a number of advantages, some of which have been described above and others of which are inherent in the invention. Also modifications may be proposed to the raised floor tractor trailer sleeper vehicle of this invention without departing from the teachings herein.

We claim:

1. A raised floor tractor trailer vehicle, comprising:
a cab engaged to a drive train bearing chassis;
a sleeper compartment including driver living space, said sleeper compartment being integrated into the cab;
said cab and sleeper compartment including a standard level mounting floor for mounting a driver's seat;
a raised floor that being higher than said standard level mounting floor rearward from said driver's seat;
at least one internally accessible storage area within said raised floor; and
said internally accessible storage areas being accessible by door in said raised floor.

2. The vehicle of claim 1, wherein:
said internally accessible storage area having AC electrical outlet for providing power to portable electrical devices stowable in said internally accessible storage area.

3. The vehicle of claim 2, wherein:
a couch installed on said raised floor.

4. The vehicle of claim 1, wherein:
said internally accessible storage area having removable bins.

5. The vehicle of claim 1, wherein:
a combination stool and table being stowable in said internally accessible storage area;
a stool of said combination stool and table consisting of a circular seat and a stem, said stem for installation in a hole in said raised floor;
said stool being usable as seating;
said stool being stowable in said internally accessible storage area and then installable into a hole in said raised floor;
said stool additionally acting as a freestanding table leg for a coffee table;
said coffee table having a female indent on a bottom allowing mating with said stool; and
said table having two legs foldable providing support for said table.

* * * * *